(12) United States Patent
LéBlanc et al.

(10) Patent No.: US 7,409,056 B2
(45) Date of Patent: *Aug. 5, 2008

(54) SWITCHBOARD FOR DUAL-RATE SINGLE-BAND COMMUNICATION SYSTEM

(75) Inventors: Wilf LéBlanc, Vancouver (CA); Phil Houghton, Surrey (CA); Kenneth Cheung, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 697 days.

This patent is subject to a terminal disclaimer.

(21) Appl. No.: 10/319,973

(22) Filed: Dec. 16, 2002

(65) Prior Publication Data

US 2004/0114750 A1  Jun. 17, 2004

(51) Int. Cl.
  *H04M 1/00* (2006.01)
(52) U.S. Cl. .................................. 379/399; 379/93.09
(58) Field of Classification Search ................ 379/399, 379/93.09
  See application file for complete search history.

(56) References Cited

U.S. PATENT DOCUMENTS

| 4,920,565 | A  |   | 4/1990  | Strawczynski et al. |          |
|-----------|----|---|---------|---------------------|----------|
| 5,570,363 | A  |   | 10/1996 | Holm                |          |
| 5,889,856 | A  | * | 3/1999  | O'Toole et al.      | 379/399.02 |
| 6,310,566 | B1 | * | 10/2001 | McNeely             | 341/123  |
| 6,665,694 | B1 | * | 12/2003 | Russell et al.      | 708/313  |
| 6,683,927 | B1 | * | 1/2004  | Ito                 | 375/355  |
| 6,748,120 | B1 | * | 6/2004  | Bradley             | 382/299  |
| 6,853,626 | B1 | * | 2/2005  | Farhang-Boroujeny et al. | 379/406.01 |
| 6,894,725 | B2 | * | 5/2005  | Hutchinson et al.   | 348/441  |
| 2002/0191681 | A1 | * | 12/2002 | Akita et al.    | 375/147  |
| 2003/0081741 | A1 | * | 5/2003  | Anne et al.     | 379/93.01 |
| 2004/0062234 | A1 | * | 4/2004  | LeBlanc et al.  | 370/352  |
| 2004/0062330 | A1 | * | 4/2004  | LeBlanc et al.  | 375/355  |

FOREIGN PATENT DOCUMENTS

WO  WO02091724 A1  11/2002

OTHER PUBLICATIONS

European Application No. EP03024385 Search Report.
Mermelstein, P; "G.722, A New CCITT Coding Standard for Digital Transmission of Wideband Audio Signals", IEEE Communications Magazine, IEEE Service Center, Piscataway, US; vol. 26, No. 1, Jan. 1988 (Jan. 1988).

* cited by examiner

*Primary Examiner*—Creighton H Smith
(74) *Attorney, Agent, or Firm*—McAndrews, Held & Malloy, Ltd.

(57) ABSTRACT

A switchboard device and methods of operation of same are disclosed. Embodiments of the invention may provide a flexible means of interconnecting wideband and narrowband communications interfaces, where wideband communications interfaces may transfer wideband data sampled at a higher sampling rate, and narrowband communication interfaces may transfer narrowband data sampled at a lower sampling rate. Data streams sampled at different sampling rates can be combined and the sampling rate of the result adjusted as needed by the destination interface. Methods of operating embodiments of the present invention are included. An additional aspect of the present invention may include machine-readable storage having stored thereon a computer program having a plurality of code sections executable by a machine for causing the machine to perform the foregoing.

21 Claims, 7 Drawing Sheets

SWITCHBOARD FOR DUAL-RATE SINGLE-BAND COMMUNICATION SYSTEM

CROSS-REFERENCE TO RELATED APPLICATIONS/INCORPORATION BY REFERENCE

This application is also related to the following co-pending applications, each of which is herein incorporated by reference:

| Ser. No. | Title | Filed | Inventors |
|---|---|---|---|
| 60/414,059 | Multiple Data Rate Communication System | Sep. 27, 2002 | LeBlanc Houghton Cheung |
| 60/414,460 | Dual Rate Single Band Communication System | Sep. 27, 2002 | LeBlanc Houghton Cheung |
| 60/414,491 | Splitter and Combiner for Multiple Data Rate Communication System | Sep. 27, 2002 | LeBlanc Houghton Cheung |
| 60/414,492 | Method and System for an Adaptive Multimode Media Queue | Sep. 27, 2002 | LeBlanc Houghton Cheung |

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Traditional voice telephony products are typically band-limited to 4 kHz bandwidth using an 8 kHz sampling rate. These products, sometimes labeled as "narrowband", include the telephone, data modems, and fax machines. Newer products aiming to achieve higher voice quality have doubled the sampling rate to 16 kHz to encompass a larger 8 kHz bandwidth, which is also known as "wideband" capable. The software implications of using a higher sampling rate are significant. Increasing the sampling rate not only increases the processing cycles needed, but also increases the memory used to store the data. In addition, software for systems supporting wider bandwidths and higher sampling rates must not preclude support for legacy band-limited functionality.

Increasing memory and processor cycles requirements is expensive because the memory and processing power footprints of digital signal processors (DSPs) are generally small. Implementing support for wider bandwidths thus requires creativeness to optimize memory and processor cycles, and in the means to support a variety of sampling rates.

In an environment with both narrowband and wideband devices, a voice call between a narrowband terminal and a wideband terminal cannot be accomplished by simply exchanging voice data streams. Voice telephony services such as conferencing require that the voice data streams from devices using different sampling rates be combined, so that each participant may hear the voices of all other participants. Combining the digital audio streams from a narrowband terminal with a lower sampling rate and a wideband terminal with a higher sampling rate requires that adjustments be made to the voice data streams to allow them to be combined. It is also necessary that the resulting combined voice data stream be made available in a form acceptable to each participant's terminal, whether it uses a lower or higher sampling rate.

Accordingly, there is a need for switchboard functionality that can support the interconnection of both narrowband devices and wideband devices.

Further limitations and disadvantages of conventional and traditional approaches will become apparent to one of skill in the art, through comparison of such systems with aspects of the present invention as set forth in the remainder of the present application with reference to the drawings.

BRIEF SUMMARY OF THE INVENTION

The present invention relates to the interconnection of telephony devices in a digital communications networks. More specifically, aspects of the present invention can be seen in a switchboard device used to interconnect voice telephony terminals operating at different sampling rates.

An embodiment in accordance with the present invention may comprise a first input for receiving a first stream of data sampled at a first sampling rate, a second input for receiving a second stream of data sampled at a second sampling rate, a converter for modifying the first stream of data producing a modified stream of data sampled at the second sampling rate, and a combiner for combining the modified stream of data and the second stream of data, producing a combined stream of data. It may further comprise a converter for modifying the combined stream of data, producing a modified combined stream of data sampled at the first sampling rate. The first and second sampling rates may be different, and the combiner may add the modified stream of data and the second stream of data. The first sampling rate may be approximately 8 kHz, and the second sampling rate may be approximately 16 kHz.

Another aspect of the present invention relates to a method of operating a switchboard device, the method comprising receiving a first stream of data sampled at a first sampling rate, receiving a second stream of data sampled at a second sampling rate, converting the first stream of data to the second sampling rate, and combining the converted first stream of data and the second stream of data, producing a combined stream of data. The method may further comprise converting the combined stream of data to the second sampling rate, where the first and second sampling rates may be different. The combining may comprise adding. The first sampling rate may be approximately 8 kHz, and the second sampling rate may be approximately 16 kHz.

A further embodiment of the present invention may include machine-readable storage, having stored thereon a computer program having a plurality of code sections executable by a machine for causing the machine to perform the foregoing.

These and other advantages, aspects, and novel features of the present invention, as well as details of illustrated embodiments, thereof, will be more fully understood from the following description and drawings.

DETAILED DESCRIPTION OF THE INVENTION

Figure 1:
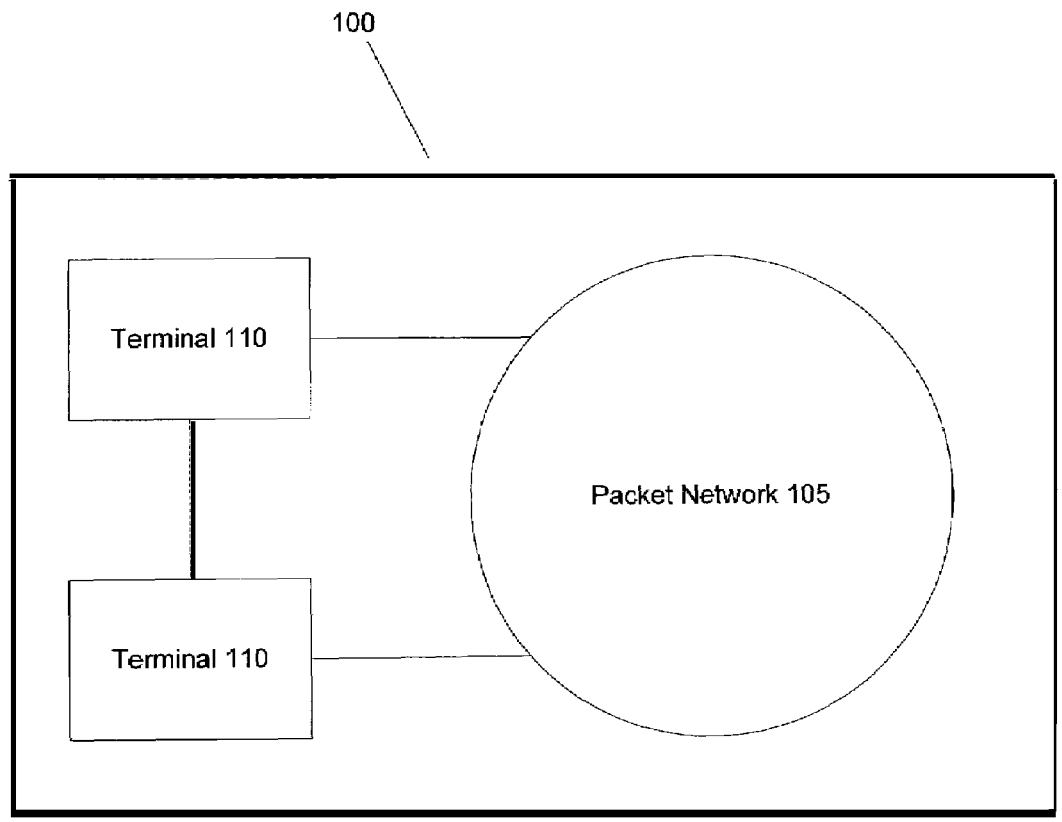
FIG. 1 is a block diagram of an exemplary communication system wherein the present invention can be practiced.

Referring now to FIG. 1, there is illustrated a block diagram of an exemplary voice over packet network 100 wherein the present invention can be practiced. The voice over packet network 100 comprises a packet network 105 and a plurality of terminals 110. The terminals 110 are capable of receiving user input. The user input can comprise, for example, voice, video, or a document for facsimile transmission.

The terminals 110 are equipped to convert the user input into an electronic signal, digitize the electronic signal, and packetize the digital samples. Additionally, the terminals 110 can selectively address a particular one of the other terminals 110, a destination terminal for transmission of the packetized digital samples.

The communication system 100 utilizes single-band data streams that may be sampled at different sampling rates. For example, one or more of terminals 110 may be narrowband terminals with a 4 kHz bandwidth, exchanging digital voice data sampled at an 8 kHz sampling rate. Other terminals 110 may operate in wideband mode using, for example, 8 kHz of bandwidth and exchanging voice data sampled at a 16 kHz sampling rate. Yet other terminals 110 may be capable of operating in either narrowband or wideband mode, or at yet another sampling rate supporting another bandwidth. The choices of the number of sampling rates and bandwidths are arbitrary, and the present invention is not limited thereby. The narrowband and wideband terminals may be similar in implementation except for the sampling rate of the media streams.

Figure 2:
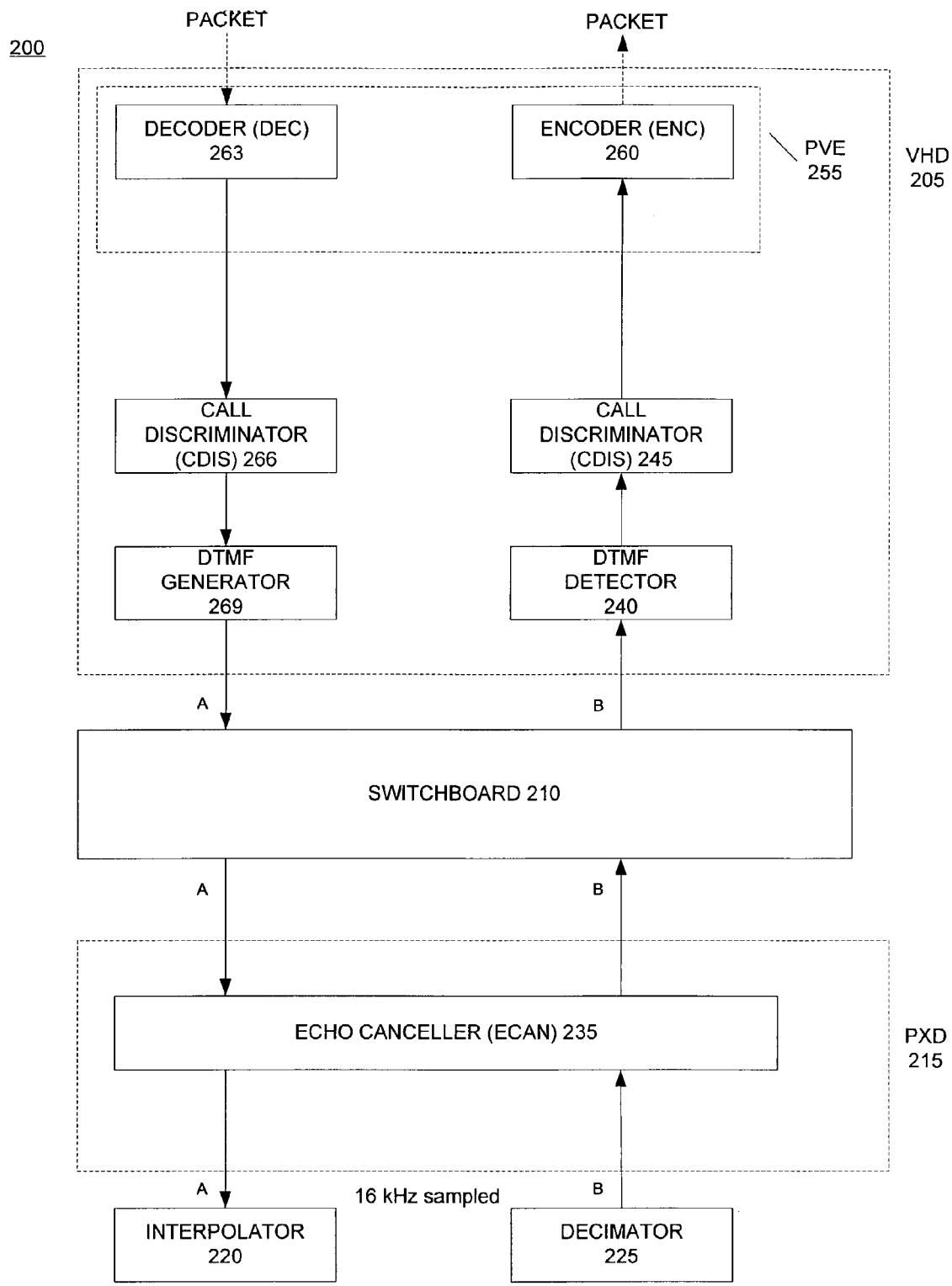
FIG. 2 is a data flow diagram for a single-band architecture in accordance with an embodiment of the present invention.

Referring now to FIG. 2, there is illustrated a signal flow diagram of a single-band architecture 200 in accordance with an embodiment of the present invention. The single-band architecture 200 includes a Virtual Hausware Driver (VHD) 205, a switchboard 210, a physical device driver (PXD) 215, an interpolator 220, and a decimator 225.

The VHD 205 is a logical interface to destination terminal 110 via the packet network 105 and performs functions such as dual tone multi-frequency (DTMF) detection and generation, and call discrimination (CDIS). During a communication (e.g., voice, video, fax) between terminals, each terminal 110 associates a VHD 205 with each of the terminal(s) 110 with which it is communicating. For example, during a voice-over-packet (VoP) network call between two terminals 110, each terminal 110 associates a VHD 205 with the other terminal 110.

The switchboard 210 associates the VHD 205 and the PXD 215 in a manner that will be described below.

The PXD 215 represents an interface for receiving the input signal from the user and performs various functions, such as echo cancellation. The top of the PXD 215 is at the switchboard 210 interface. The bottom of the PXD 215 is at the interpolator 220 and decimator 225 interface. In general, the functions within a wideband PXD 215 would be designed to use 16 kHz sampled data, while functions in a narrowband PXD 215 would expect to process 8 kHz sampled data.

A wideband system may contain a mix of narrowband and wideband VHDs 205 and PXDs 215. A difference between narrowband and wideband device drivers is their ingress and egress sample buffer interface. A wideband VHD 205 or PXD 215 has wideband data at its sample buffer interface and includes wideband services and functions. A narrowband VHD 205 or PXD 215 has narrowband data at its sample buffer interface and can include narrowband services and functions. The switchboard interfaces with narrowband and wideband VHDs 205 and PXDs 215 through their sample buffer interfaces. The switchboard 210 is incognizant of the wideband or narrowband nature of the device drivers, but is aware of the sampling rate of the data that it reads and writes data through the sample buffer interfaces. To accommodate differences in the sampling rates of data streams, an embodiment of the present invention may upsample data received from narrowband sources and downsample data being sent to narrowband destinations. The sample buffer interfaces may provide data at any arbitrary sampling rate. In an embodiment of the present invention, the narrowband sample buffer interface may provide data sampled at 8 kHz and the wideband sample buffer interface may provide data sampled at 16 kHz. Additionally, a VHD 205 may be dynamically changed between wideband and narrowband and vice versa.

The VHD 205 and PXD 215 driver structures may include sample rate information to identify the sampling rates of the wideband and narrowband data. The information may be part of the interface structure that the switchboard understands and may contain a buffer pointer and an enumeration constant or the number of samples to indicate the sample rate.

The single-band architecture 200 is also characterized by an ingress path and an egress path, wherein the ingress path transmits user inputs to the packet network, and wherein the egress path receives packets from the packet network 105. The ingress path and the egress path can either operate in a wideband support mode or a narrowband support mode. Additionally, the ingress path and the egress path are not required to operate in the same mode. For example, the ingress path can operate in the wideband support mode, while the egress path operates in the narrowband mode. The ingress path comprises the decimator 225, echo canceller 235, switchboard 210, and services including but not limited to DTMF detector 240 and CDIS 245, and packet voice engine (PVE) 255 comprising an encoder algorithm 260.

In the ingress path of a wideband device, the decimator 225 receives the user inputs and provides 16 kHz sampled data, B, for an 8 kHz band-limited signal. The 16 kHz sampled data, B, is transmitted through echo canceller 235 and switchboard 210 to the VHD 205 associated with the destination terminal 110. In some cases, the DTMF detector 240 may be designed for operation on only narrowband digitized samples, and wideband data, B, is downsampled and passed to DTMF detector 240. Similarly, where CDIS 245 is designed for operation on only narrowband digitized samples, only the downsampled wideband data is provided to CDIS 245, which distinguishes a voice call from a facsimile transmission.

The PVE 255 is responsible for issuing media queue mode change commands consistent with the active encoder and decoder. The media queues can comprise, for example, the media queues described in provisional patent application Ser. No. 60/414,492, "Method and System for an Adaptive Multimode Media Queue", which is incorporated herein by reference in its entirety. The PVE 255 ingress thread receives raw samples. Depending upon the operating mode of VHD 205, the raw samples include either narrowband or wideband data. At PVE 255, encoder 260 packetizes the sampled data for transmission over the packet network 105. The encoder 260 can comprise, for example, the BroadVoice 32 Encoder made by Broadcom, Inc.

The egress path comprises decoder 263, CDIS 266, DTMF generator 269, switchboard 210, echo canceller 235, and interpolator 220. The egress queue receives data packets from the packet network 105 at the decoder 263. The decoder 263 can comprise the BroadVoice 32 Decoder made by Broadcom, Inc. The decoder 263 decodes data packets received from the packet network 105 and provides 16 kHz sampled data. If CDIS 266 and DTMF generator support 16 kHz sampled data, the 16 kHz sampled is provided to CDIS 266 and DTMF generator 269. Again, in one embodiment, where CDIS 266 and DTMF generator 269 require narrowband digitized samples, the wideband data may be downsampled and used by CDIS 266 and the DTMF generator 269.

The DTMF generator 269 generates DTMF tones if detected from the sending terminal 110. These tones are written to the wideband data, A. The wideband data, A, is received by the switchboard 210, which provides the data to the PXD 215. The sampled data is passed through the echo canceller 235 and provided to interpolator 220. The interpolator 220 provides 16 kHz sampled data.

Figure 3:
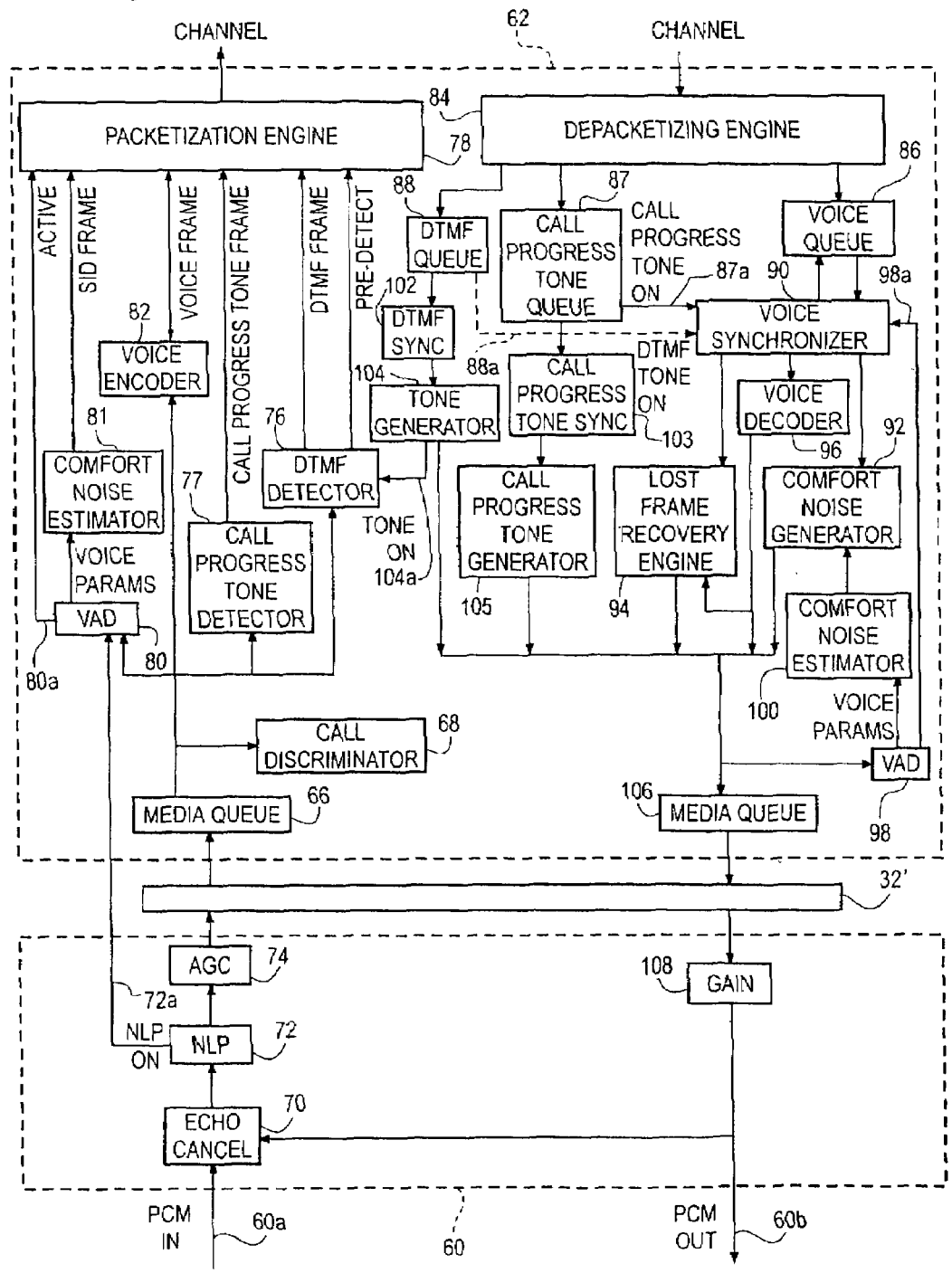
FIG. 3 is a system block diagram of a signal processing system operating in a voice mode in accordance with an illustrative embodiment of the present invention.

The services invoked by the network VHD in the voice mode and the associated PXD are shown schematically in FIG. 3. In the described exemplary embodiment, the PXD 60 provides two-way communication with a telephone or a circuit-switched network, such as a PSTN line (e.g. DS0) carrying a 64 kb/s pulse code modulated (PCM) signal, i.e., digital voice samples.

The incoming PCM signal 60a is initially processed by the PXD 60 to remove far-end echoes that might otherwise be transmitted back to the far-end user. As the name implies, echoes in telephone systems are the return of the talker's voice resulting from the operation of the hybrid with its two-four wire conversion. If there is low end-to-end delay, echo from the far end is equivalent to side-tone (echo from the near-end), and therefore, not a problem. Side-tone gives users feedback as to how loudly they are talking, and indeed, without side-tone, users tend to talk too loudly. However, far-end echo delays of more than about 10 to 30 msec significantly degrade the voice quality and are a major annoyance to the user.

An echo canceller 70 is used to remove echoes from far-end speech present on the incoming PCM signal 60a before routing the incoming PCM signal 60a back to the far-end user. The echo canceller 70 samples an outgoing PCM signal 60b from the far-end user, filters it, and combines it with the incoming PCM signal 60a. Preferably, the echo canceller 70 is followed by a non-linear processor (NLP) 72 which may mute the digital voice samples when far-end speech is detected in the absence of near-end speech. The echo canceller 70 may also inject comfort noise which in the absence of near-end speech may be roughly at the same level as the true background noise or at a fixed level.

After echo cancellation, the power level of the digital voice samples is normalized by an automatic gain control (AGC) 74 to ensure that the conversation is of an acceptable loudness. Alternatively, the AGC can be performed before the echo canceller 70. However, this approach would entail a more complex design because the gain would also have to be applied to the sampled outgoing PCM signal 60b. In the described exemplary embodiment, the AGC 74 is designed to adapt slowly, although it should adapt fairly quickly if overflow or clipping is detected. The AGC adaptation should be held fixed if the NLP 72 is activated.

After AGC, the digital voice samples are placed in the media queue 66 in the network VHD 62 via the switchboard 32'. In the voice mode, the network VHD 62 invokes three services, namely call discrimination, packet voice exchange, and packet tone exchange. The call discriminator 68 analyzes the digital voice samples from the media queue to determine whether a 2100 Hz tone, a 1100 Hz tone or V.21 modulated HDLC flags are present. If either tone or HDLC flags are detected, the voice mode services are terminated and the appropriate service for fax or modem operation is initiated. In the absence of a 2100 Hz tone, a 1100 Hz tone, or HDLC flags, the digital voice samples are coupled to the encoder system which includes a voice encoder 82, a voice activity detector (VAD) 80, a comfort noise estimator 81, a DTMF detector 76, a call progress tone detector 77 and a packetization engine 78.

Typical telephone conversations have as much as sixty percent silence or inactive content. Therefore, high bandwidth gains can be realized if digital voice samples are suppressed during these periods. A VAD 80, operating under the packet voice exchange, is used to accomplish this function. The VAD 80 attempts to detect digital voice samples that do not contain active speech. During periods of inactive speech, the comfort noise estimator 81 couples silence identifier (SID) packets to a packetization engine 78. The SID packets contain voice parameters that allow the reconstruction of the background noise at the far end.

From a system point of view, the VAD 80 may be sensitive to the change in the NLP 72. For example, when the NLP 72 is activated, the VAD 80 may immediately declare that voice is inactive. In that instance, the VAD 80 may have problems tracking the true background noise level. If the echo canceller 70 generates comfort noise during periods of inactive speech, it may have a different spectral characteristic from the true background noise. The VAD 80 may detect a change in noise character when the NLP 72 is activated (or deactivated) and declare the comfort noise as active speech. For these reasons, the VAD 80 should generally be disabled when the NLP 72 is activated. This is accomplished by a "NLP on" message 72a passed from the NLP 72 to the VAD 80.

The voice encoder 82, operating under the packet voice exchange, can be a straight 16-bit PCM encoder or any voice encoder which supports one or more of the standards promulgated by ITU. The encoded digital voice samples are formatted into a voice packet (or packets) by the packetization engine 78. These voice packets are formatted according to an applications protocol and sent to the host (not shown). The voice encoder 82 is invoked only when digital voice samples with speech are detected by the VAD 80. Since the packetization interval may be a multiple of an encoding interval, both the VAD 80 and the packetization engine 78 should cooperate to decide whether or not the voice encoder 82 is invoked. For example, if the packetization interval is 10 msec and the encoder interval is 5 msec (a frame of digital voice samples is 5 ms), then a frame containing active speech should cause the subsequent frame to be placed in the 10 ms packet regardless of the VAD state during that subsequent frame. This interaction can be accomplished by the VAD 80 passing an "active" flag 80a to the packetization engine 78, and the packetization engine 78 controlling whether or not the voice encoder 82 is invoked.

In the described exemplary embodiment, the VAD 80 is applied after the AGC 74. This approach provides optimal flexibility because both the VAD 80 and the voice encoder 82 are integrated into some speech compression schemes such as those promulgated in ITU Recommendations G.729 with Annex B VAD (March 1996)—Coding of Speech at 8 kbits/s Using Conjugate-Structure Algebraic-Code-Exited Linear Prediction (CS-ACELP), and G.723.1 with Annex A VAD (March 1996)—Dual Rate Coder for Multimedia Communications Transmitting at 5.3 and 6.3 kbit/s, the contents of which is hereby incorporated herein by reference as though set forth in full herein.

Operating under the packet tone exchange, a DTMF detector 76 determines whether or not there is a DTMF signal present at the near end. The DTMF detector 76 also provides a pre-detection flag 76a which indicates whether or not it is likely that the digital voice sample might be a portion of a DTMF signal. If so, the pre-detection flag 76a is relayed to the packetization engine 78 instructing it to begin holding voice packets. If the DTMF detector 76 ultimately detects a DTMF signal, the voice packets are discarded, and the DTMF signal is coupled to the packetization engine 78. Otherwise the voice packets are ultimately released from the packetization engine 78 to the host (not shown). The benefit of this method is that there is only a temporary impact on voice packet delay when a DTMF signal is pre-detected in error, and not a constant buffering delay. Whether voice packets are held while the pre-detection flag 76a is active could be adaptively controlled by the user application layer.

Similarly, a call progress tone detector 77 also operates under the packet tone exchange to determine whether a precise signaling tone is present at the near end. Call progress tones are those which indicate what is happening to dialed phone calls. Conditions like busy line, ringing called party, bad number, and others each have distinctive tone frequencies and cadences assigned them. The call progress tone detector 77 monitors the call progress state, and forwards a call progress tone signal to the packetization engine to be packetized and transmitted across the packet based network. The call progress tone detector may also provide information regarding the near end hook status which is relevant to the signal processing tasks. If the hook status is on hook, the VAD should preferably mark all frames as inactive, DTMF detection should be disabled, and SID packets should only be transferred if they are required to keep the connection alive.

The decoding system of the network VHD 62 essentially performs the inverse operation of the encoding system. The decoding system of the network VHD 62 comprises a de-packetizing engine 84, a voice queue 86, a DTMF queue 88, a precision tone queue 87, a voice synchronizer 90, a DTMF synchronizer 102, a precision tone synchronizer 103, a voice decoder 96, a VAD 98, a comfort noise estimator 100, a comfort noise generator 92, a lost packet recovery engine 94, a tone generator 104, and a precision tone generator 105.

The de-packetizing engine 84 identifies the type of packets received from the host (i.e., voice packet, DTMF packet, call progress tone packet, SID packet), transforms them into frames which are protocol independent. The de-packetizing engine 84 then transfers the voice frames (or voice parameters in the case of SID packets) into the voice queue 86, transfers the DTMF frames into the DTMF queue 88 and transfers the call progress tones into the call progress tone queue 87. In this manner, the remaining tasks are, by and large, protocol independent.

A jitter buffer is utilized to compensate for network impairments such as delay jitter caused by packets not arriving with the same relative timing in which they were transmitted. In addition, the jitter buffer compensates for lost packets that occur on occasion when the network is heavily congested. In the described exemplary embodiment, the jitter buffer for voice includes a voice synchronizer 90 that operates in conjunction with a voice queue 86 to provide an isochronous stream of voice frames to the voice decoder 96.

Sequence numbers embedded into the voice packets at the far end can be used to detect lost packets, packets arriving out of order, and short silence periods. The voice synchronizer 90 can analyze the sequence numbers, enabling the comfort noise generator 92 during short silence periods and performing voice frame repeats via the lost packet recovery engine 94 when voice packets are lost. SID packets can also be used as an indicator of silent periods causing the voice synchronizer 90 to enable the comfort noise generator 92. Otherwise, during far-end active speech, the voice synchronizer 90 couples voice frames from the voice queue 86 in an isochronous stream to the voice decoder 96. The voice decoder 96 decodes the voice frames into digital voice samples suitable for transmission on a circuit switched network, such as a 64 kb/s PCM signal for a PSTN line. The output of the voice decoder 96 (or the comfort noise generator 92 or lost packet recovery engine 94 if enabled) is written into a media queue 106 for transmission to the PXD 60.

The comfort noise generator 92 provides background noise to the near-end user during silent periods. If the protocol supports SID packets, (and these are supported for VTOA, FRF-11, and VoIP), the comfort noise estimator at the far-end encoding system should transmit SID packets. Then, the background noise can be reconstructed by the near-end comfort noise generator 92 from the voice parameters in the SID packets buffered in the voice queue 86. However, for some protocols, namely, FRF-11, the SID packets are optional, and other far-end users may not support SID packets at all. In these systems, the voice synchronizer 90 continues to operate properly. In the absence of SID packets, the voice parameters of the background noise at the far end can be determined by running the VAD 98 at the voice decoder 96 in series with a comfort noise estimator 100.

Preferably, the voice synchronizer 90 is not dependent upon sequence numbers embedded in the voice packet. The voice synchronizer 90 can invoke a number of mechanisms to compensate for delay jitter in these systems. For example, the voice synchronizer 90 can assume that the voice queue 86 is in an underflow condition due to excess jitter and perform packet repeats by enabling the lost frame recovery engine 94. Alternatively, the VAD 98 at the voice decoder 96 can be used to estimate whether or not the underflow of the voice queue 86 was due to the onset of a silence period or due to packet loss. In this instance, the spectrum and/or the energy of the digital voice samples can be estimated and the result 98a fed back to the voice synchronizer 90. The voice synchronizer 90 can then invoke the lost packet recovery engine 94 during voice packet losses and the comfort noise generator 92 during silent periods.

When DTMF packets arrive, they are de-packetized by the de-packetizing engine 84. DTMF frames at the output of the de-packetizing engine 84 are written into the DTMF queue 88. The DTMF synchronizer 102 couples the DTMF frames from the DTMF queue 88 to the tone generator 104. Much like the voice synchronizer, the DTMF synchronizer 102 is employed to provide an isochronous stream of DTMF frames to the tone generator 104. Generally speaking, when DTMF packets are being transferred, voice frames should be suppressed. To some extent, this is protocol dependent. However, the capability to flush the voice queue 86 to ensure that the voice frames do not interfere with DTMF generation is desirable. Essentially, old voice frames which may be queued are discarded when DTMF packets arrive. This will ensure that there is a significant gap before DTMF tones are generated. This is achieved by a "tone present" message 88a passed between the DTMF queue and the voice synchronizer 90.

The tone generator 104 converts the DTMF signals into a DTMF tone suitable for a standard digital or analog telephone. The tone generator 104 overwrites the media queue 106 to prevent leakage through the voice path and to ensure that the DTMF tones are not too noisy.

There is also a possibility that DTMF tone may be fed back as an echo into the DTMF detector 76. To prevent false detection, the DTMF detector 76 can be disabled entirely (or disabled only for the digit being generated) during DTMF tone generation. This is achieved by a "tone on" message 104a passed between the tone generator 104 and the DTMF detector 76. Alternatively, the NLP 72 can be activated while generating DTMF tones.

When call progress tone packets arrive, they are de-packetized by the de-packetizing engine 84. Call progress tone frames at the output of the de-packetizing engine 84 are written into the call progress tone queue 87. The call progress tone synchronizer 103 couples the call progress tone frames from the call progress tone queue 87 to a call progress tone generator 105. Much like the DTMF synchronizer, the call progress tone synchronizer 103 is employed to provide an isochronous stream of call progress tone frames to the call progress tone generator 105. And much like the DTMF tone generator, when call progress tone packets are being transferred, voice frames should be suppressed. To some extent, this is protocol dependent. However, the capability to flush the voice queue 86 to ensure that the voice frames do not interfere with call progress tone generation is desirable. Essentially, old voice frames which may be queued are discarded when call progress tone packets arrive to ensure that there is a significant inter-digit gap before call progress tones are generated. This is achieved by a "tone present" message 87a passed between the call progress tone queue 87 and the voice synchronizer 90.

The call progress tone generator 105 converts the call progress tone signals into a call progress tone suitable for a standard digital or analog telephone. The call progress tone generator 105 overwrites the media queue 106 to prevent leakage through the voice path and to ensure that the call progress tones are not too noisy.

The outgoing PCM signal in the media queue 106 is coupled to the PXD 60 via the switchboard 32'. The outgoing PCM signal is coupled to an amplifier 108 before being outputted on the PCM output line 60b.

Figure 4:
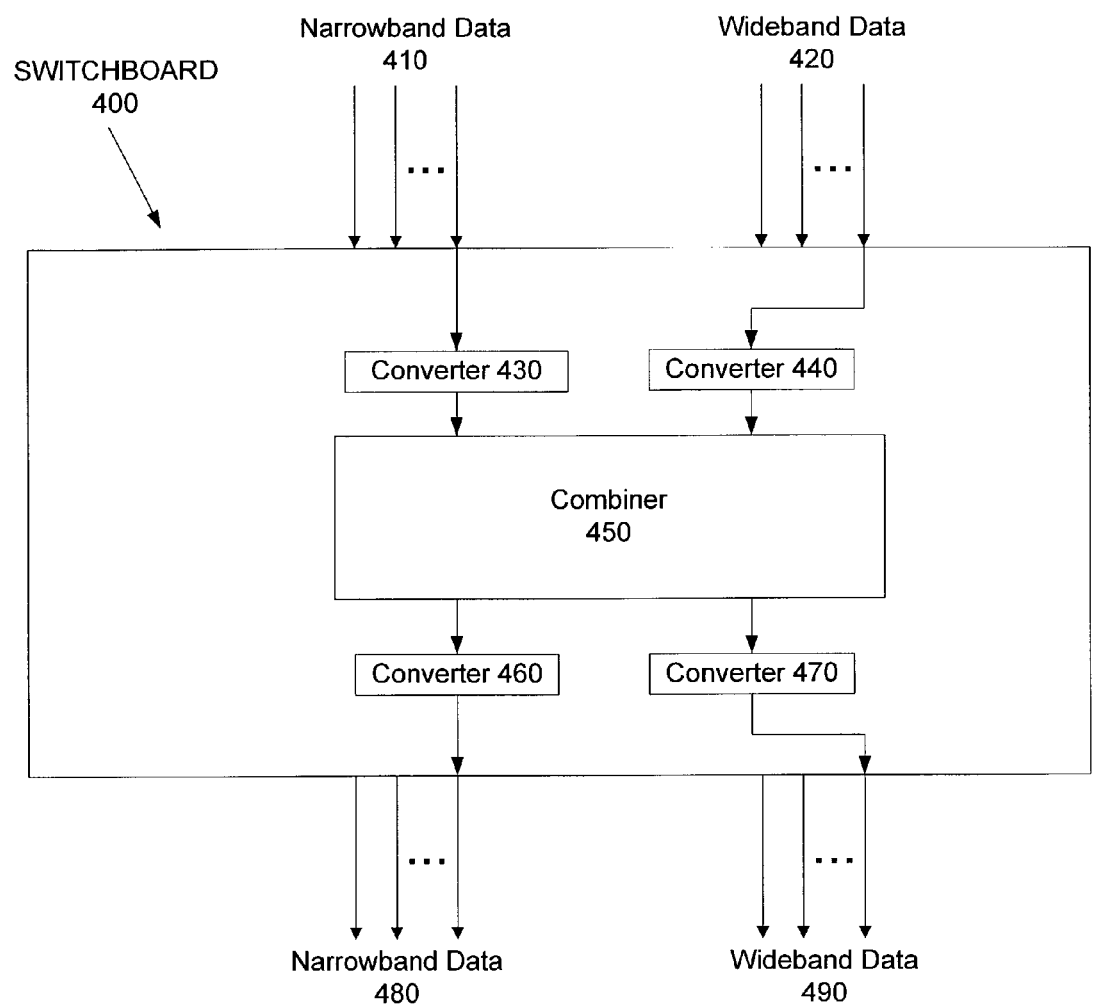
FIG. 4 is a high-level block diagram of a switchboard device in accordance with an embodiment of the present invention.

An exemplary embodiment according to the present invention is shown in FIG. 4. As shown in FIG. 4, the switchboard 400 is responsible for establishing connections between input ports and output ports and when necessary, combining input data streams to form output data streams. In addition, the switchboard 400 may provide for the upsampling of data received from narrowband sources to be sent to wideband destinations, and for the downsampling of data received from wideband sources to be sent to narrowband destinations. It may also pass data unchanged. In order to combine input data streams sampled at different sampling rates, switchboard 400 may resample such input data streams to a common sampling rate. Similarly, in order to provide one or more output data streams each with a sampling rate appropriate to its designated destination, switchboard 400 may resample a data stream to the sampling rate that may be required by a specific device or service.

As shown in the exemplary embodiment illustrated in FIG. 4, the switchboard module 400 comprises combiner 450, with converters 430 and 440 at its inputs, and converters 460 and 470 at its outputs. Converters 430, 440, 460 and 470 may be designed to upsample, downsample, or to pass unchanged the sampled data received at their inputs. As illustrated in FIG. 4, narrowband data 410 is provided to input converter 430, which may upsample the narrowband data to the sampling rate of the wideband data 420. It then provides the upsampled data to combiner 450. At the same time, wideband data 420 is provided to converter 440 which may pass the wideband data unchanged to combiner 450. The combiner is responsible for combining the input data streams where combining may include but is not limited to, for example, adding inputs, subtracting inputs, passing inputs unchanged, or any combination of these operations. Although FIG. 4 shows combiner 450 as having two inputs and two outputs, one of skill in the art will recognize that embodiments with greater or fewer inputs and outputs do not depart from the spirit of the invention. The output of combiner 450 may be provided to one or more converters such as converter 460 and converter 470. As shown in the illustration, converter 460 may be used to downsample the combined data from combiner 450 to form narrowband data 480. In addition, converter 470 may be used to pass the combined data from combiner 450 unchanged to form wideband data 490.

The switchboard understands and operates on source and destination ports. As shown in the illustration, switchboard 400 may have a number of input ports for streams of narrowband data 410 and wideband data 420, and may have a number of output ports for streams of narrowband data 480 and wideband data 490. A port may be a PXD or a VHD, and in a system utilizing multiple sampling rates a port's identity may indicate its sampling rate. To embed sample rate information into the switchboard ports, the PXD and VHD structures may contain a switchboard port structure that not only provides a pointer to the data buffer, but also sample rate information in either the number of samples or an enumeration type.

The switchboard ports are used in a switchboard connection list to manage input and output media ports. In an exemplary case, a switchboard port type, SWB_Port, may be the following:

typedef MediaPort*SWB_Port;

The switchboard port may be a pointer to a media port structure, which in an exemplary case may be defined as:

```
typedef struct
{
SINT16 *bufp;
MediaRateShift sampleRateShift;
} MediaPort;
```

The media port structure may contain a data buffer pointer and the buffer's sample rate information, and the sample rate information may be stored as a left shift value. The switchboard may operate on a fixed block rate in milliseconds. The sample block size depends on the sampling rate, and the left shift value provides an efficient means to convert block rate (in sampling rate frequency) to block size (in samples). In an exemplary case,

```
typedef enum
{
    Media8kHzSampleShift = 0;
    Media16kHzSampleShift = 1;
} MediaRateShift;
```

Figure 5:
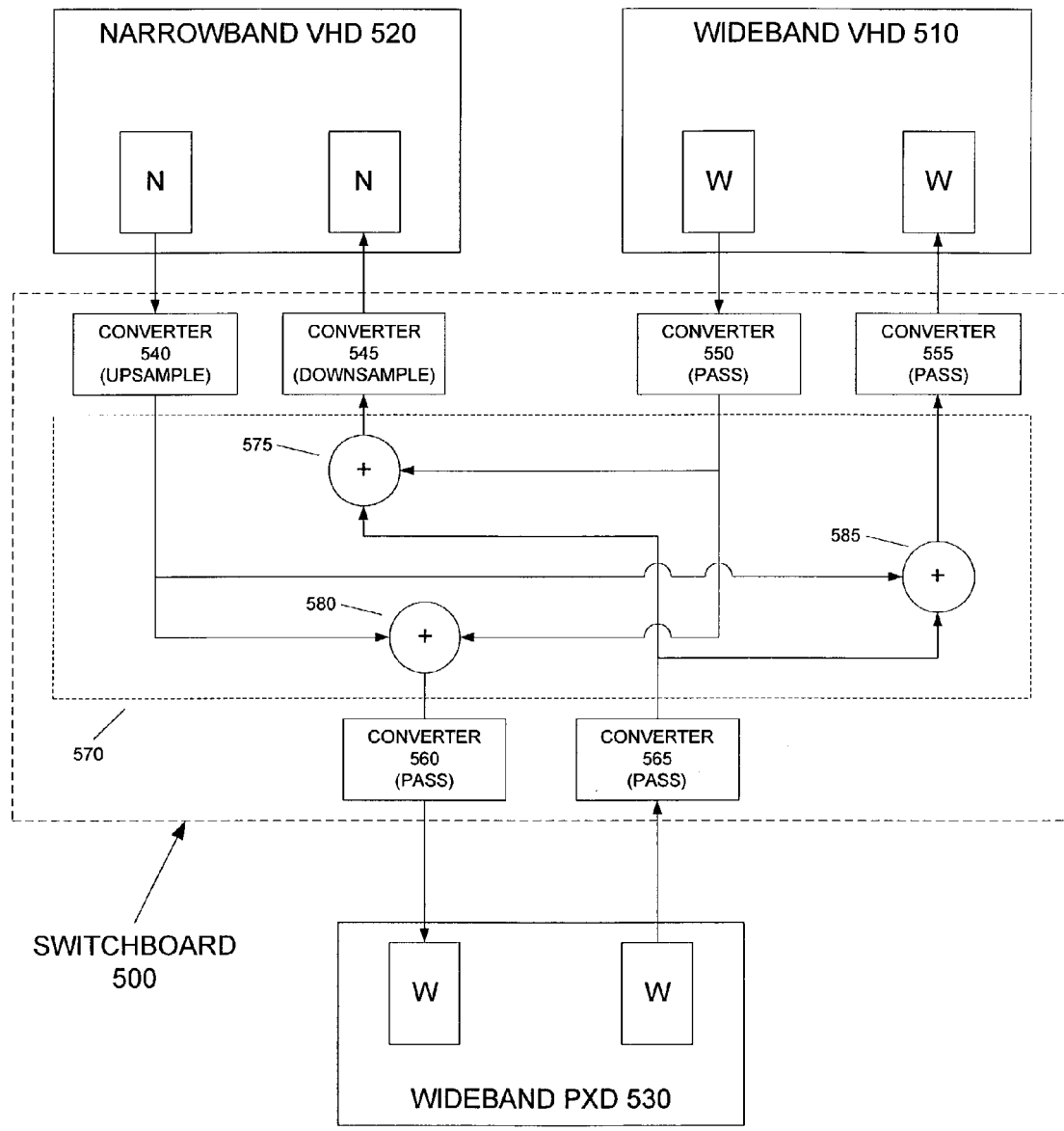
FIG. 5 is a data flow diagram for a switchboard connection between a wideband PXD and two VHDs, one wideband and the other narrowband, in accordance with an embodiment of the present invention.

Referring now to FIG. 5, there is illustrated a signal flow diagram for a switchboard connection between a wideband PXD 530, a narrowband VHD 520, and a wideband VHD 510, in accordance with an illustrative embodiment of the present invention. The connections depicted in FIG. 5 as switchboard 500 are implemented by the switchboard 210 functionality illustrated in FIG. 2, also shown in FIG. 3 as switchboard 32' and in FIG. 4 as switchboard 400. Such connections may exist, for example, when the device is a party to a conference call. Wideband VHD 510 is associated with a wideband destination device, while narrowband VHD 520 is associated with a narrowband destination device. In the illustrative embodiment, narrowband VHD 520 transmits and receives narrowband data, N, while wideband VHD 510 and wideband PXD 530 transmit and receive wideband data, W.

On the egress side, converter 540 upsamples the narrowband data from narrowband VHD 520 and provides the upsampled data to summer 580 in combiner 570. Converter 550 passes the wideband data from wideband VHD 510 unchanged to summer 580. The summed output of summer 580 is then provided to converter 560, which passes the combined data unchanged to wideband PXD 530. On the ingress side, converter 565 of switchboard 500 passes the wideband data from PXD 530 unchanged to summer 575. Wideband data from wideband VHD 510 is passed unchanged by converter 550 to summer 575, where it is added to the wideband data from PXD 530. The resulting wideband data is then downsampled by converter 545 and provided to narrowband VHD 520. The unmodified wideband data from PXD 530 is also provided to summer 585, where it is summed with the upsampled narrowband data of narrowband VHD 520 provided by converter 540. The resulting sum is then passed unchanged by converter 555 to wideband VHD 510. Although this exemplary embodiment shows switchboard 500 providing service to one wideband VHD, one narrowband VHD, and one wideband PXD, this does not represent a limitation of the present invention. The spirit of the present invention extends to embodiments with a greater number of VHDs and PXDs, and a greater variety of sampling rates.

Figure 6:
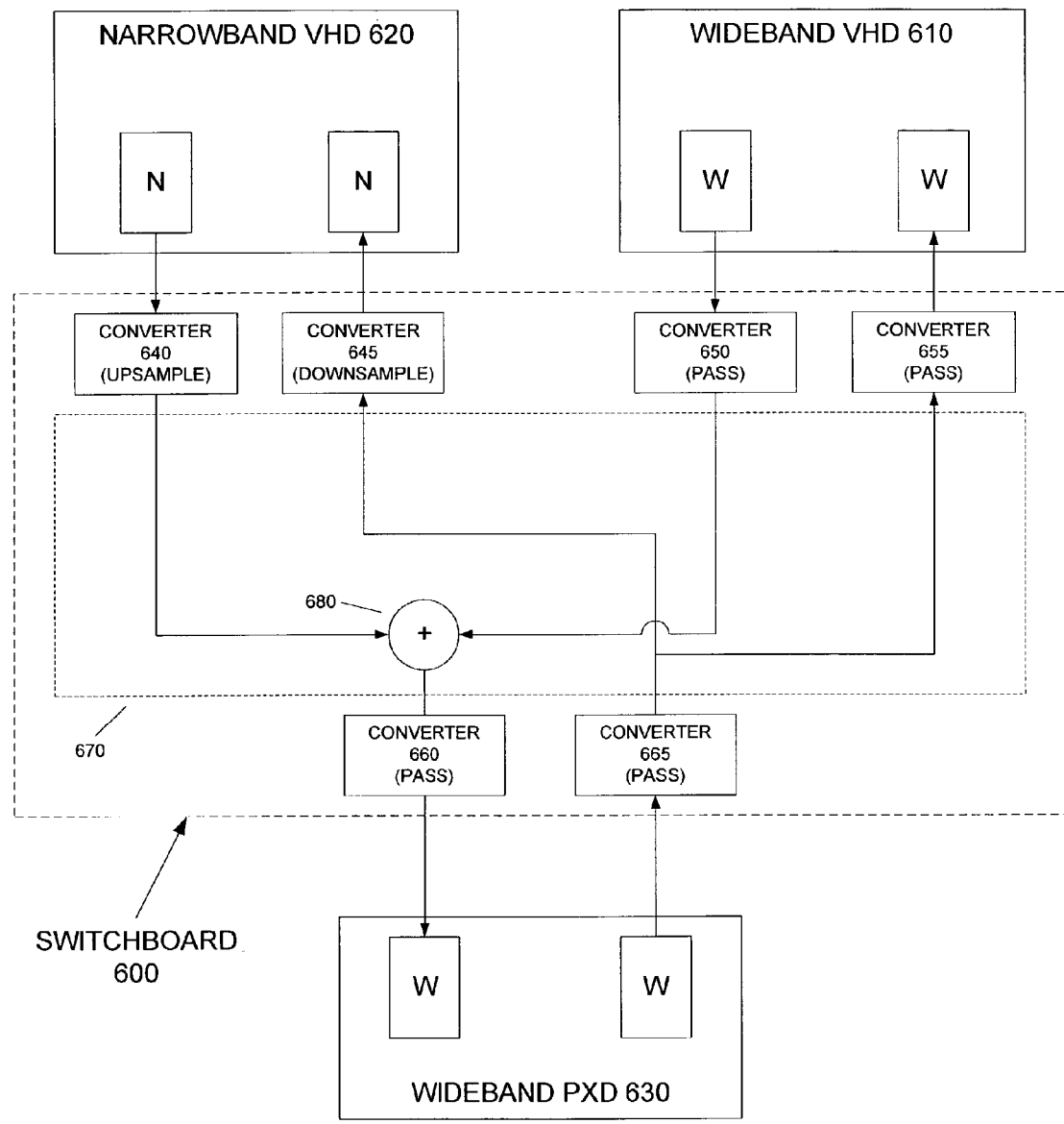
FIG. 6 is a data flow diagram for a switchboard connection between a wideband PXD, a wideband VHD, and a narrowband VHD in accordance with an embodiment of the present invention.

FIG. 6 shows a further embodiment according to the present invention, in which is illustrated a signal flow diagram for a switchboard connection between wideband PXD 630, wideband VHD 610, and narrowband VHD 620. The connections depicted in FIG. 6 as switchboard 600 may also be implemented by the switchboard functionality 210 illustrated in FIG. 2, switchboard 32' of FIG. 3, or switchboard 400 of FIG. 4. The connections shown in FIG. 6 may be created when the user terminal associated with wideband PXD 630 establishes a conference call with the wideband communication devices associated with wideband VHD 610 and narrowband VHD 620. Wideband VHD 610 and wideband PXD 630 transmit and receive wideband data, W. Narrowband VHD 620 transmits and receives narrowband data, N.

As illustrated in FIG. 6, on the egress side converter 640 provides upsampled narrowband data from narrowband VHD 620 to summer 680 in combiner 670. Converter 650 passes the wideband data from wideband VHD 610 unchanged to summer 680. The summed output of summer 680 is then provided to converter 660, which passes the combined data unchanged to wideband PXD 630. On the ingress side, converter 665 of switchboard 600 passes the wideband data from PXD 630 unchanged to converter 645 and converter 655. Converter 645 downsamples the wideband data from wideband PXD 630 and provides narrowband data to narrowband VHD 620, while converter 655 passes the wideband data from wideband PXD 630 unchanged to wideband VHD 610. Again, although the embodiment illustrated shows switchboard 600 providing service to one wideband VHD, one narrowband VHD, and one wideband PXD, this does not represent a limitation of the present invention. The spirit of the present invention extends to embodiments with a greater number of VHDs and PXDs, and a greater variety of sampling rates.

Figure 7:
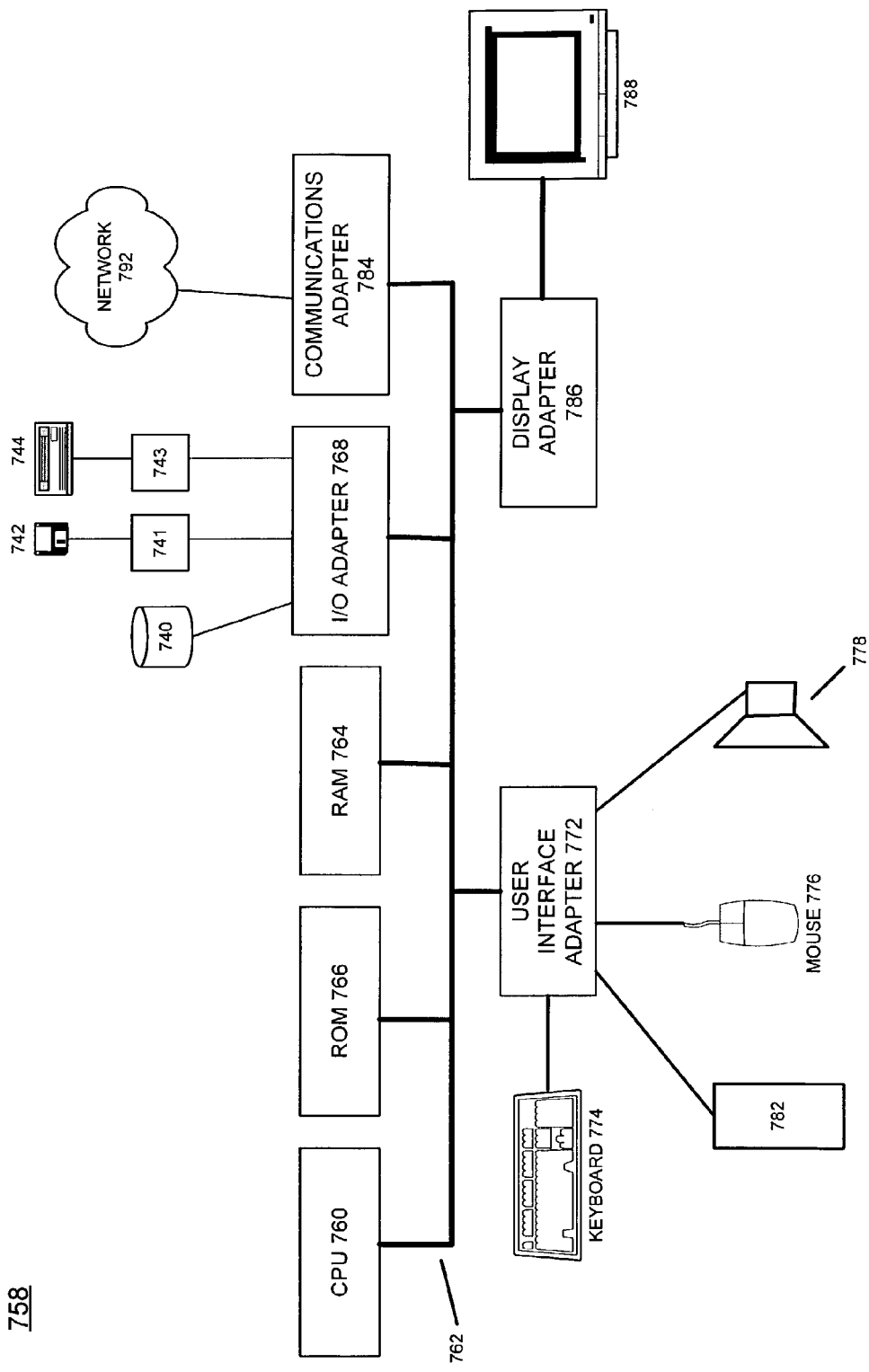
FIG. 7 is a block diagram of an exemplary terminal in which aspects of the present invention may be practiced.

Referring now to FIG. 7, there is illustrated a block diagram of an exemplary terminal 758, corresponding to terminal 110 as depicted in FIG. 1, in which an embodiment of the present invention may be practiced. A processor 760 is interconnected via system bus 762 to random access memory (RAM) 764, read-only memory (ROM) 766, an input/output adapter 768, a user interface adapter 772, a communications adapter 784, and a display adapter 786. The input/output adapter 768 connects peripheral devices such as hard disc drive 740, floppy disc drives 741 for reading removable floppy discs 742, and optical disc drives 743 for reading removable optical disc 744. The user interface adapter 772 connects devices such as a keyboard 774, a speaker 778, and microphone 782 to the bus 762. The microphone 782 generates audio signals that are digitized by the user interface adapter 772. The speaker 778 receives audio signals that are converted from digital samples to analog signals by the user interface adapter 772. The display adapter 786 connects a display 788 to the bus 762. Embodiments of the present invention may also be practiced in other types of terminals as well, including but not limited to, a telephone without a hard disk drive 740, a floppy disk drive 741, or optical disk drive 743, including those in which the program instructions may be stored in ROM 766, or downloaded over communications adapter 784 and stored in RAM 764. An embodiment may also be practiced in, for example, a portable hand-held terminal with little or no display capability, in a consumer home entertainment system, or even in a multi-media game system console.

An embodiment of the present invention can be implemented as sets of instructions resident in the RAM 764 or ROM 766 of one or more terminals 758 configured generally as described in FIG. 7. Until required by the terminal 758, the set of instructions may be stored in another memory readable by the processor 760, such as hard disc drive 740, floppy disc 742, or optical disc 744. One skilled in the art would appreciate that the physical storage of the sets of instructions physically changes the medium upon which it is stored electrically, magnetically, or chemically so that the medium carries information readable by a processor.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A switchboard device comprising:
   a first input for receiving a first stream of data sampled at a first sampling rate;
   a second input for receiving a second stream of data sampled at a second sampling rate;
   a first converter for modifying the first stream of data, producing a modified stream of data sampled at the second sampling rate;
   a combiner for combining the modified stream of data and the second stream of data, producing a combined stream of data; and
   a second converter for modifying the combined stream of data, producing a modified combined stream of data sampled at the first sampling rate.

2. The switchboard device of claim 1 wherein the first and second sampling rates are different.

3. The switchboard device of claim 1 wherein the combiner adds the modified stream of data and the second stream of data.

4. The switchboard device of claim 1 wherein the first sampling rate is approximately 8 kHz.

5. The switchboard device of claim 1 wherein the second sampling rate is approximately 16 kHz.

6. A method of operating a switchboard device, the method comprising:
   receiving a first stream of data sampled at a first sampling rate;
   receiving a second stream of data sampled at a second sampling rate;
   converting the first stream of data to the second sampling rate;
   combining the converted first stream of data and the second stream of data, producing a combined stream of data; and
   converting the combined stream of data to the second sampling rate.

7. The method of claim 6 wherein the first and second sampling rates are different.

8. The method of claim 6 wherein the combining comprises adding.

9. The method of claim 6 wherein the first sampling rate is approximately 8 kHz.

10. The method of claim 6 wherein the second sampling rate is approximately 16 kHz.

11. A machine-readable storage, having stored thereon a computer program having a plurality of code sections for implementing a switchboard device, the code sections executable by a machine for causing the machine to perform the operations comprising:
   receiving a first stream of data sampled at a first sampling rate;
   receiving a second stream of data sampled at a second sampling rate;
   converting the first stream of data to the second sampling rate;
   combining the converted first stream of data and the second stream of data, producing a combined stream of data; and
   converting the combined stream of data to the second sampling rate.

12. The machine-readable storage of claim 11 wherein the first and second sampling rates are different.

13. The machine-readable storage of claim 11 wherein the combining comprises adding.

14. The machine-readable storage of claim 11 wherein the first sampling rate is approximately 8 kHz.

15. The machine-readable storage of claim 11 wherein the second sampling rate is approximately 16 kHz.

16. One or more circuits for selectively combining streams of data samples to produce an output stream of data samples at an output sampling rate, the one or more circuits comprising:
   at least one interface for receiving the streams of data samples;
   at least one processor operably coupled to the at least one interface and operable to perform:
      receiving samples of a first stream of data samples sampled at a first sampling rate;
      receiving samples of a second stream of data samples sampled at a second sampling rate;
      converting samples of the first stream of data samples and samples of the second stream of data samples to a selected common sampling rate, wherein converting comprises one of upsampling, downsampling, and passing unchanged; and
      combining samples of the converted first stream of data samples and samples of the converted second stream of data samples to produce a stream of combined data samples at the selected common sampling rate; and
      converting the combined stream of data samples to the output sampling rate.

17. The one or more circuits of claim 16, wherein the selected common sampling rate is based upon the first sampling rate, the second sampling rate, and the output sampling rate.

18. The one or more circuits of claim 16, wherein the selected common sampling rate is selected from the first sampling rate, the second sampling rate, and the output sampling rate.

19. The one or more circuits of claim 16, wherein the streams of data samples comprise digitized audio.

20. The one or more circuits of claim 16, wherein combining comprises adding.

21. The one or more circuits of claim 16, wherein the combined stream of data samples is converted to two streams of data samples, one of the two streams at the output sampling rate, and the other of the two at a different sampling rate.

* * * * *